United States Patent
Kang (10) Patent No.: US 10,063,075 B2
(45) Date of Patent: Aug. 28, 2018

(54) ELECTRONIC DEVICE CAPABLE OF PERFORMING DATA COMMUNICATION AND METHOD FOR CHARGING THE SAME

(71) Applicant: Samsung Electronics Co., Ltd., Suwon-si (KR)

(72) Inventor: Ildong Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 140 days.

(21) Appl. No.: 14/973,209

(22) Filed: Dec. 17, 2015

(65) Prior Publication Data

US 2016/0181840 A1 Jun. 23, 2016

(30) Foreign Application Priority Data

Dec. 23, 2014 (KR) .................. 10-2014-0187572

(51) Int. Cl.
*H02J 7/00* (2006.01)
*G06F 1/20* (2006.01)
*G06F 1/16* (2006.01)
*G06F 1/26* (2006.01)

(52) U.S. Cl.
CPC ........... *H02J 7/0045* (2013.01); *G06F 1/163* (2013.01); *G06F 1/26* (2013.01); *H02J 7/007* (2013.01); *H02J 7/0052* (2013.01); *H02J 2007/0062* (2013.01)

(58) Field of Classification Search
CPC ....... Y02E 60/12; H02J 7/0042; H02J 7/0045; H01M 10/44; H01M 10/46; G06F 1/163; G06F 1/1628; G06F 1/1626; G06F 1/1635; A41D 1/002

USPC ..................................... 320/107; 361/679.03
See application file for complete search history.

(56) References Cited

U.S. PATENT DOCUMENTS

| | | | |
|---|---|---|---|
| 7,649,674 B2 | 1/2010 | Danner et al. | |
| 7,843,624 B2 | 11/2010 | Danner et al. | |
| 2003/0099164 A1* | 5/2003 | Noirjean | A44C 5/0007 368/282 |
| 2004/0081025 A1* | 4/2004 | Chen | G04B 37/1486 368/10 |
| 2006/0140055 A1* | 6/2006 | Ehrsam | A44C 5/18 368/10 |
| 2009/0315513 A1* | 12/2009 | Mkhitarian | H02J 7/0045 320/114 |
| 2011/0007468 A1* | 1/2011 | Burton | G04F 10/00 361/679.03 |
| 2013/0234644 A1* | 9/2013 | Weeks | H02J 7/0045 320/101 |
| 2013/0329532 A1* | 12/2013 | Sorias | G04C 10/00 368/64 |
| 2014/0187233 A1* | 7/2014 | Chen | H04M 1/0277 455/422.1 |

* cited by examiner

*Primary Examiner* — Yalkew Fantu
*Assistant Examiner* — Mohammed J Sharief
(74) *Attorney, Agent, or Firm* — McAndrews, Held & Malloy, Ltd.

(57) ABSTRACT

An electronic device capable of performing data communication and method of charging the same are provided. The electronic device comprises a device body, a band that couples the device body to a target object, a fastening part that adjusts a fit of the band to the target object, a fixing strap movably coupled to the band, and an interface terminal installed in the fixing strap, wherein a charging state is determined according to the position of the fixing strap relative to the band.

17 Claims, 7 Drawing Sheets

ELECTRONIC DEVICE CAPABLE OF PERFORMING DATA COMMUNICATION AND METHOD FOR CHARGING THE SAME

RELATED APPLICATION(S)

The present application claims the benefit under 35 U.S.C. § 119(a) of Korean patent application filed on Dec. 23, 2014 in the Korean Intellectual Property Office and assigned Serial number 10-2014-0187572, the entire disclosure of which is hereby incorporated by reference.

BACKGROUND

The present disclosure relates to an electronic device that can perform data communication and, more specifically, to an electronic device with a waterproof charging terminal.

In recent years, wearable electronic devices such as smart glasses, smart watch, fitness band, wearable robot, etc., have been spotlighted as the most promising fields.

Particularly, a smart watch in the shape of a watch or band, which can be worn on a wrist, is a representative wearable device.

Such a smart watch is equipped with a charging terminal. However, since the charging terminal is likely to be exposed to moisture, a water-proofing function is required.

In order to keep the smart watch water-proof, the charging terminal should not be installed on the exterior, and a power adaptor that may use a different connector than is used by many electronic devices presently. For example, a very popular connector used is the universal serial bus (USB) connector for Android phones and many other electronic devices.

Accordingly, for a conventional smart watch an additional charger and a cable may be required that is only usable for the smart watch.

Further, a socket for power charging on the smart watch may have a movable cover for water-proofing. Accordingly, in cases where the additional component is used, the movable cover may need to be removed prior to charging and then replaced after charging.

Therefore, the conventional smart watch that uses a connector that cannot be used by other devices makes it inconvenient for the user.

In order to overcome the problems, a USB connector is installed as a charging terminal on an end portion of a fixing strap that fixes a band for a smart watch, and charging is performed by using a general-purpose USB cable. However, even in this case, an additional component, such as a movable cover for water-proofing, is required that has to be separately handled.

SUMMARY

The present disclosure has been conceived to solve such problems in the related art, and an aspect of the present disclosure is to provide an electronic device that can perform charging by using a general-purpose USB cable without a separate adaptor or a connector on the exterior of a smart watch, and a method for charging the same.

Another aspect of the present disclosure is to provide an electronic device that can protect a charging terminal in order to protect the charging terminal and prevent a battery from being discharged, and a method for charging the same.

Yet another aspect of the present disclosure is to provide an electronic device in which a fixing strap can slide to a charging position to thereby facilitate charging, and a method for charging the same.

In accordance with an aspect of the present disclosure, an electronic device comprises: a device body; a band that couples the device body to a target object; a fastening part that adjusts a fit of the band coupled to the target object; a fixing strap movably coupled to the band; and an interface terminal installed in the fixing strap, wherein a charging state is determined according to the position of the fixing strap relative to the band.

The band may comprise a first band and a second band, and the first band comprises the fastening part.

The fixing strap may be securely placed on the first band so as to slide thereon without falling off.

The interface terminal may be installed in the interior of the fixing strap, and a space into which the second band is inserted is formed between the interface terminal and the first band.

The fixing strap may comprise a connector charging terminal coupled to the interface terminal.

The electronic device may further comprise a device charging terminal for charging the device body and a movable cover to protect the device charging terminal, wherein the movable cover may be moved to provide access to the device charging terminal, and wherein the movable cover may comprise one or more seals made of electrically insulated material to protect the device charging terminal.

The fixing strap may slide to a predetermined position of the band, and the movable cover is opened and closed according to the movement of the fixing strap such that the device charging terminal and the connector charging terminal are connected to each other.

When the movable cover is over the device charging terminal the device charging terminal may not be electrically connected to the connector charging terminal.

When the fixing strap is at a predetermined position, charging may be performed via a USB cable inserted into the interface terminal.

The movable cover may be cut away in the shape of an inverted triangle with respect to the device charging terminal, and the movable cover is connected to the interface terminal through a connecting member.

The band may comprise a receiving section for receiving the movable cover, and the movable cover and the fixing strap are coupled to each other through a coupling bracket.

The device charging terminal may be installed in the device body, and the movable cover may be enabled to cover the device charging terminal or expose the device charging terminal.

The device body may comprise a receiving section for receiving the movable cover and an interworking member that enables interworking between a movement of the fixing strap and opening/closing of the movable cover.

The interworking member may comprise an interworking bracket that couples the movable cover and the interface terminal, and the interworking bracket comprises the connector charging terminal.

In accordance with another aspect of the present disclosure, an electronic device may comprise: a device body; a band for wearing the device body on a target object; a fastening part that is configured to adjust a fit of the band to the target object; a fixing strap movably coupled to the band; an interface terminal installed in the fixing strap; a device charging terminal for charging the device body; a connector charging terminal coupled to the interface terminal; and a movable cover installed to open and close the device charging terminal, wherein the movable cover is opened or closed according to a movement of the fixing strap such that the device charging terminal and the connector charging terminal are electrically connected to each other when the movable cover is opened, or electrically separated from each other when the movable cover is closed.

The band may comprise the device charging terminal, and the fixing strap comprises the connector charging terminal.

The device body may comprise the device charging terminal, and an interworking member that enables interworking between the movement of the fixing strap and opening/closing of the movable cover comprises the connector charging terminal.

In accordance with yet another aspect of the present disclosure, a method of charging an electronic device comprising: inserting a USB cable in to an interface terminal in a fixing strap, the inserting promoting movement of the fixing strap, wherein the movement of the fixing strap opens a movable cover of a device charging terminal, wherein the opened movable cover allows electrical connection of the device charging terminal and the connector charging terminal, wherein the connector charging terminal is a part of the fixing strap and is electrically connected to the interface terminal, and the device charging terminal is electrically connected to a battery of the electronic device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications can be made to the various embodiments described herein without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used in embodiments of the present disclosure, the expression "include" or "may include" or "can include" refers to the existence of a corresponding function, operation, or constituent element, and does not limit one or more additional functions, operations, or constituent elements. Further, as used in embodiments of the present disclosure, the term, such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in embodiments of the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second," as used in the present disclosure may modify various constituent elements, such constituent elements are not limited by the above expressions. For example, the above expressions may not indicate a specific order and/or relative importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a first component is referred to as being "connected" or "accessed" to a second component, it should be understood that the first component may be directly connected or accessed to the second component, but also that a third component may be interposed between the first and second components. Contrarily, when the first component is referred to as being "directly connected" or "directly accessed" to the second component, it should be understood that there is no other component between the first component and the second component.

In various embodiments of the present disclosure, an electronic device may be a device that involves a communication function. Accordingly, an electronic device may be, for example, a smart phone, personal computer (PC), a tablet PC, a mobile phone, a video phone, an e-book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer-3 (MP3) player, a portable medical device, a digital camera, or a wearable device (e.g., a Head-Mounted Device (HMD), such as electronic glasses, electronic clothes, an electronic bracelet, an electronic necklace, electronic tattoos, an electronic appcessory, a smart watch, etc.).

Figure 1:
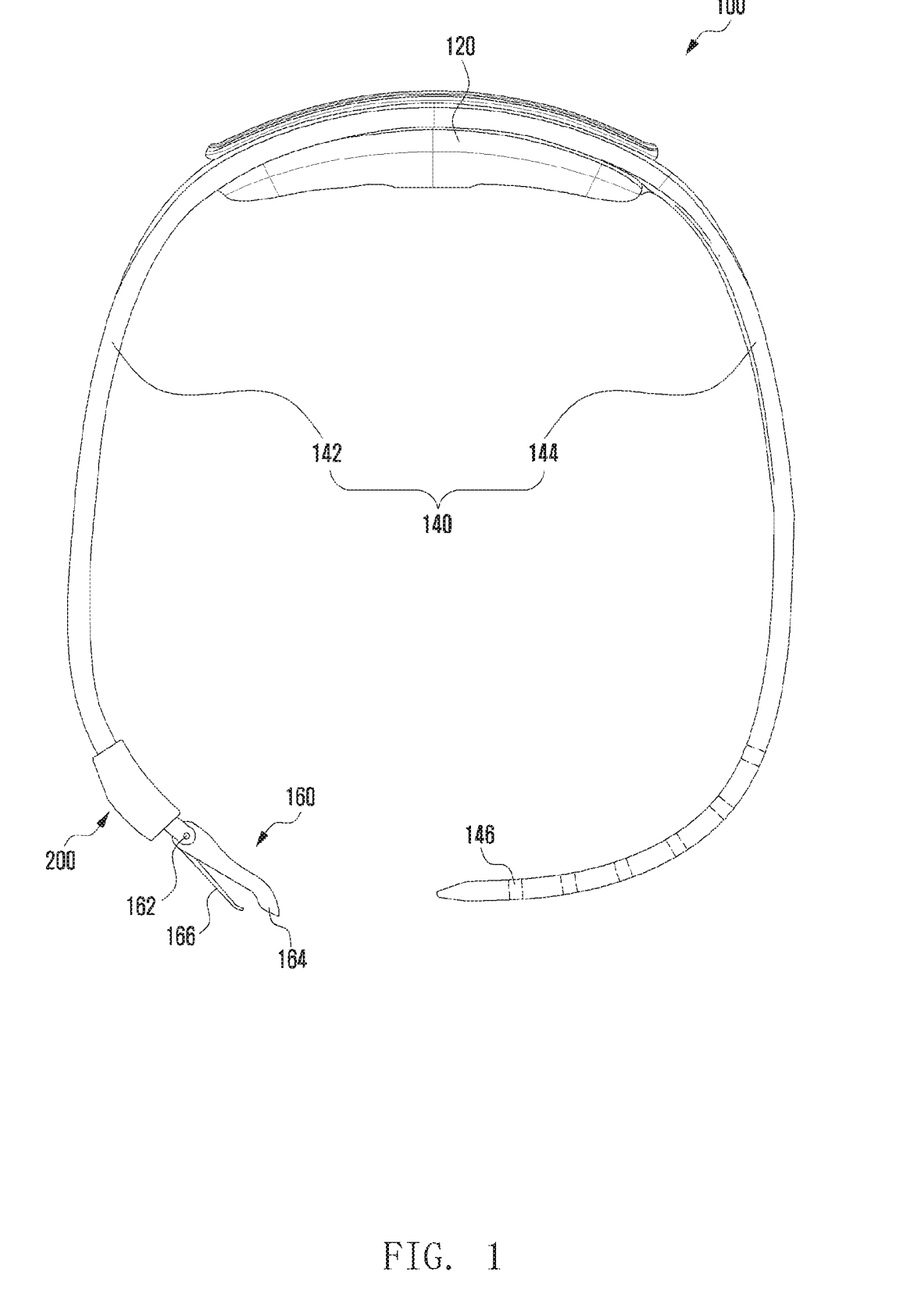
FIG. 1 is a side view illustrating a wearable electronic device according to various embodiments of the present disclosure.
Figure 2:
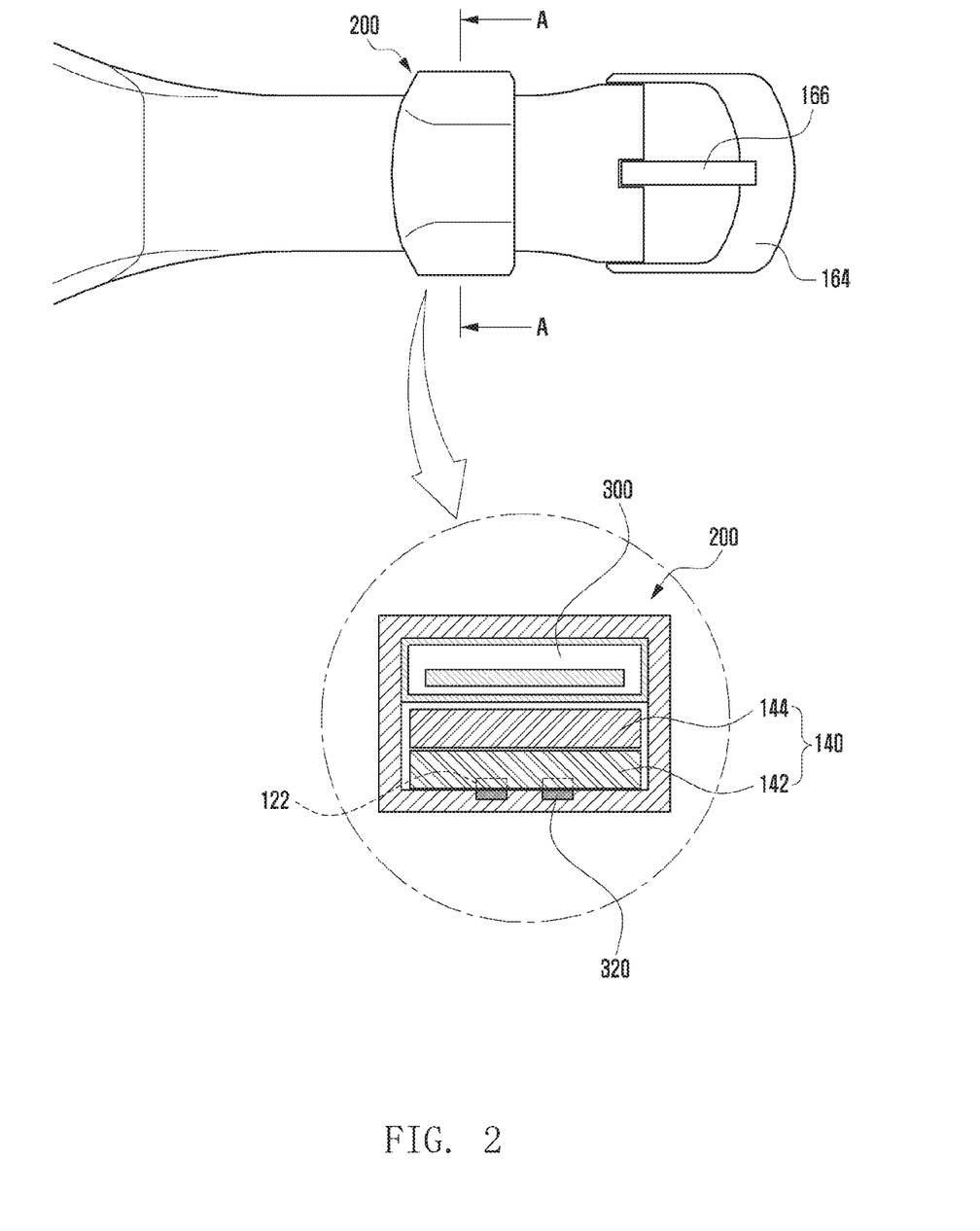
FIG. 2 illustrates a fastening part and a fixing strap for fixing a band, which are illustrated in FIG. 1, where a dashed circle represents a detailed section view along line A-A.

FIG. 1 illustrates a wearable electronic device according to various embodiments of the present disclosure, and FIG. 2 illustrates a fastening part 160 and a fixing strap 200 for fixing a band, which are illustrated in FIG. 1, where a dashed circle represents a detailed section view along line A-A of FIG. 2.

Referring to FIGS. 1 and 2, the electronic device, for example a wearable device, according to the various embodiments of the present disclosure, is a smart watch 100 that includes a device body 120 and a band 140 by which the device body 120 is worn on a user's wrist. An interface terminal 300 (FIG. 2) may be installed in the fixing strap 200 that fixes the band 140 of the smart watch 100. That is, the fixing strap 200 secures the end of a strap so that it is not loose. A USB terminal may be installed as the interface terminal 300, and various other interface terminals, in addition to that, may be installed.

The term "user" used in the various embodiments of the present disclosure may refer to a person or a device (e.g., an artificial intelligence electronic device) that uses an electronic device, namely, a wearable electronic device.

The band 140 may include a first band 142 and a second band 144, and the first band 142 may include the fastening part 160 for wearing the device body 120 by adjusting the length of the band 140 according to the thickness of an object on which the electronic device is worn, for example, according to the thickness of the user's wrist. Accordingly, the band 140 may be said to couple the electronic device (smart watch 100) to the target object, which may be a wrist of a person wearing the electronic device.

The band 140 may be, for example, integrally formed in order to wear the device body 120, and in this case, the fastening part 160 may be configured such that the device body 120 may be worn on the integrated band 140.

In addition, the second band 144 may have a plurality of fastening holes 146 formed therein, which may be, for example, at equal intervals.

The fastening part 160 may include a ring member 164 coupled to a hinge shaft 162 mounted to the first band 142 and a latch 166 that has one end coupled to the hinge shaft 162 and an opposite end protruding toward the inside of the ring member 164 such that the latch 166 can be inserted into one of the fastening holes 146 when the second band 144 is placed through the ring member 164.

The length of the band 140 may be adjusted to be suitable for the thickness of the user's wrist by inserting the second band 144 into the ring member 164 of the fastening part 160, and then inserting the latch 166 of the fastening part 160 into one of the fastening holes 146.

In the case of a watch-type smart watch, it is common for a user to wear the device body 120 on his/her wrist by adjusting the length of the band 140 using the fastening part 160 that includes the hinge shaft 162, the ring member 164, and the latch 166. The device body 120 may also be worn in various manners by configuring the fastening part 160 differently.

Further, the fixing strap 200 may be securely placed on the first band 142 so as to slide thereon without falling off, and may be able to move various positions.

The fit of the band 140 around, for example, a wrist, may be adjusted by inserting the latch 166 into one of the fastening holes 146 in the second band 144, and the second band 144 may be inserted into the fixing strap 200 so that the second band 144 can be positioned adjacent to the first band 142.

The smart watch 100 (electronic device/wearable device), according to the exemplary embodiment of the present disclosure, may include the interface terminal 300 (FIG. 2) to which a corresponding connector of a cable (not shown) such as, for example, a general-purpose USB cable, may be connected.

The interface terminal 300 may be installed, for example, in the interior of the fixing strap 200, and a space into which the second band 144 is inserted may be formed between the lower surface of the interface terminal 300 and the upper surface of the first band 142.

The interface terminal 300 may include connector charging terminals 320 for charging, and when the fixing strap 200 slides to a predetermined position along the first band 142, charging may be performed by inserting the USB cable into the interface terminal 300.

To this end, electricity may flow from the USB cable (not shown) to the device body 120 via the interface terminal 300, the connector charging terminals 320, and the device charging terminals 122.

In an embodiment of the present disclosure, the fixing strap 200 may include the connector charging terminals 320.

Figure 3:
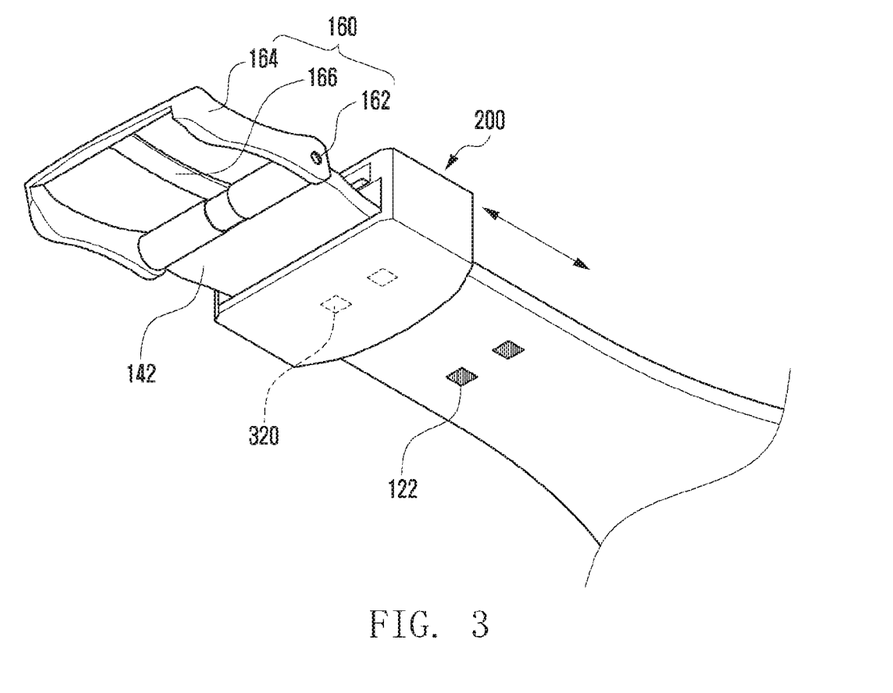
FIG. 3 is a schematic perspective view illustrating how the fixing strap for fixing a band from FIG. 1 moves.
Figure 4:
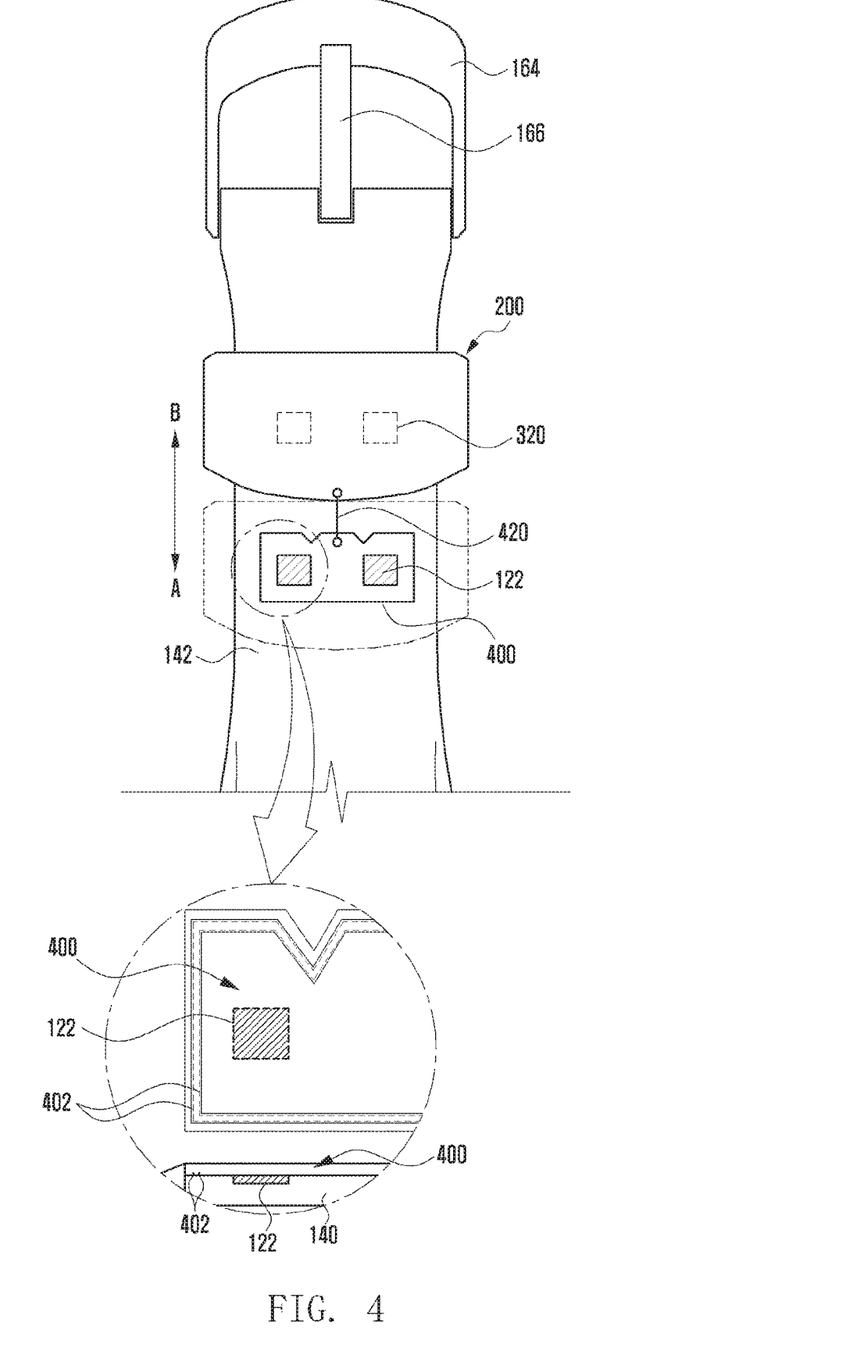
FIG. 4 is a plan view of FIG. 3.

FIGS. 3 and 4 illustrate a state where the fixing strap for fixing a band of FIG. 1 moves.

Referring to FIGS. 3 and 4, in various embodiments of the present disclosure the device charging terminals 122 may be installed on the band 140 of the wearable device, particularly, on the lower surface of the first band 142, and may be covered or exposed by a cover 400 (FIG. 4) to provide water-proofing when not charging and access when charging. Although not shown, the cover 400 may be secured so as not to fall off when moved to cover or expose the device charging terminals 122. The securing may be any one of known methods for similar functionality, as well as any methods to be developed in the future.

The cover 400 may be opened when the fixing strap 200 moves to a position A indicated by a dotted line, and may be closed when the fixing strap 200 moves to a position B indicated by a solid line.

The cover 400 may include one or more seals 402 on the periphery thereof for water-proofing, and the seals 402 may be made of appropriate non-conductive material such as, for example, natural rubber, synthetic rubber, styrene-butadiene rubber, etc. The seals 402 may be implemented as any one of numerous appropriate implementations presently known, or to be discovered in the future.

That is, after a general-purpose USB cable (not illustrated) is inserted into the interface terminal 300 (FIG. 2), the fixing strap 200 to which the interface terminal 300 is attached may slide along the first band 142 to be located at the position A of the first band 142.

At this time, the cover 400 is opened by a force depending on the sliding of the fixing strap 200, and the connector charging terminals 320, which are provided on the fixing strap 200, and the device charging terminals 122, which are mounted on the lower surface of the first band 142, are connected to each other so that electricity may be conducted.

As described above, when the fixing strap 200 moves to a position A of the first band 142, the connector charging terminals 320 and the device charging terminals 122 are electrically connected to each other, thereby allowing charging.

In contrast, when the fixing strap 200 slides to the position B, the connector charging terminals 320 and the device charging terminals 122 may be separated from each other, and the cover 400 may cover the device charging terminals 122, thereby water-proofing the device charging terminals 122. Further, foreign substances (not shown) may be attached to the device charging terminals 122 to further prevent electricity from being conducted, which may prevent gradual discharging of a battery.

The opening/closing of the cover 400 according to the sliding of the fixing strap 200 may be configured in various forms.

Figure 5:
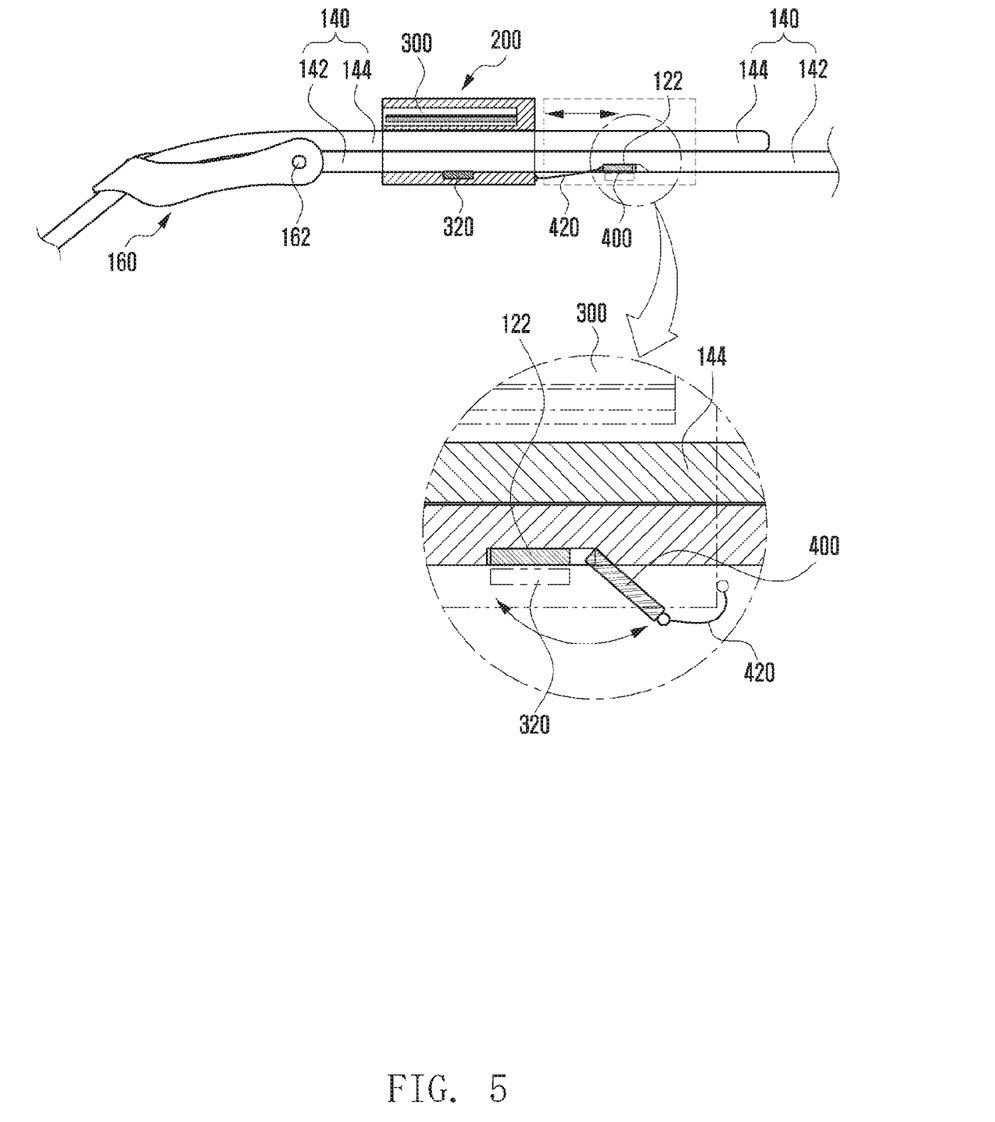
FIG. 5 is a schematic view illustrating an operation of opening a cover according to an embodiment of the present disclosure.

Referring to FIGS. 4 and 5, one end of the cover 400 for the device charging terminals 122, which are mounted on the first band 142, may be connected to the interface terminal 300 through a connecting member 420, such as a thread, a string, a cord, a strap, a lace, a spring, etc. When the connecting member 420 is flexible, the cover 400 may be opened by, for example, moving the fixing strap 200 toward the cover 400. For example, some portion of the fixing strap 200 may push against the cover 400 when the fixing strap 200 is moved to position B. When the fixing strap 200 is moved to position A, the connecting member 420 may pull the cover 400 in place over the device charging terminals 122. One side of the cover 400 may be cut away in the shape of an inverted triangle with respect to the device charging terminals 122, and this side may be connected to the connecting member 420. The cut away may be performed, for example, to differentiate one side of the cover 400 from its opposite side.

When the fixing strap 200, to which the interface terminal 300 is attached, slides along the first band 142 to position A, the cover 400 is accordingly opened so that the connector charging terminals 320 and the device charging terminals 122 may be connected to each other.

In contrast, when the fixing strap 200 slides along the first band 142 to position B, the cover 400 may be closed according to the movement of the fixing strap 200 because the cover 400 is connected to the fixing strap 200 and the connecting member 420.

When the cover 400 is closed, the connector charging terminals 320 and the device charging terminals 122 may be separated from each other, and the device charging terminals 122 may be closed.

The cover 400 of the wearable device (electronic device) of the present disclosure may also be configured as a sliding cover 500.

Figure 6:
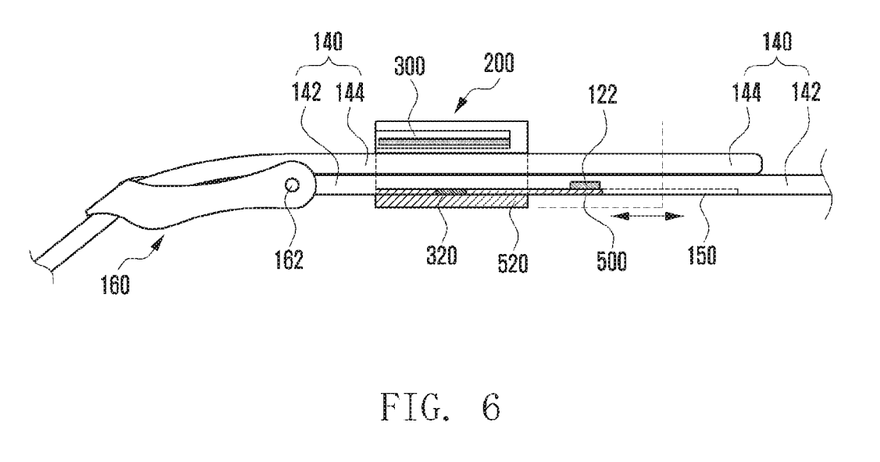
FIG. 6 is a schematic view illustrating an operation of opening a cover according to another embodiment of the present disclosure.

Referring to FIG. 6, the first band 142 may include a receiving section 150 for receiving the sliding cover 500.

The sliding cover 500 and the fixing strap 200 may be connected through a coupling bracket 520 to be spaced a predetermined distance apart from each other.

When the fixing strap 200 moves, the sliding cover 500 may slide in conjunction with the movement of the fixing strap 200 so that the movement of the fixing strap 200 and the opening/closing of the sliding cover 500 may interwork with each other.

Referring to FIG. 6, when a general-purpose USB cable is inserted into the interface terminal 300 for charging when the sliding cover 500 covers the device charging terminals 122 as shown by a solid line, the fixing strap 200 moves toward the device charging terminals 122, and the sliding cover 500 slides in conjunction with the movement of the fixing strap 200 and is received in the receiving section 150 illustrated by a dotted line so that the device charging terminals 122 can be exposed and electrically connected to the connector charging terminals 320.

In contrast, when the fixing strap 200 moves back toward the fastening part 160, away from the device charging terminals 122, the sliding cover 500 can once again cover the device charging terminals 122. Accordingly, the device charging terminals 122 and the connector charging terminals 320 are separated from each other, and the device charging terminals 122 are covered by the sliding cover 500 so that the device charging terminals 122 may again be water-proofed.

Although the device charging terminals 122 are installed in the first band 142 in the above description, the device charging terminals 122 may also be directly installed in the device body 120 of the smart watch 100.

Figure 7:
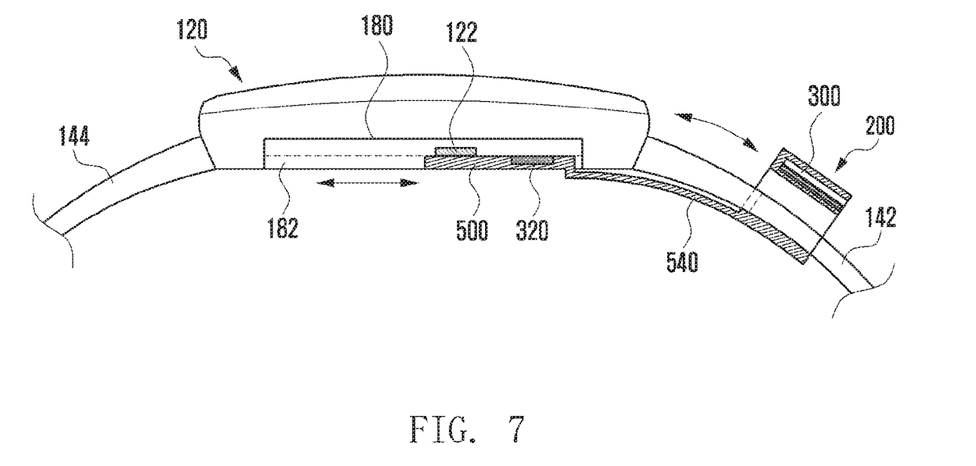
FIG. 7 is a schematic view illustrating device charging terminals installed in the device body of the wearable electronic device according to various embodiments of the present disclosure.

FIG. 7 illustrates device charging terminals installed in the device body of the wearable device (electronic device) according to various embodiments of the present disclosure.

As illustrated in FIG. 7, device charging terminals 122 and a sliding cover 500 may be formed in the device body 120, specifically, in a battery cover 180 included in the device body 120.

Further, the device charging terminals 122 may be opened and closed for water-proofing and charging by the sliding of the sliding cover 500.

Although not specifically illustrated, it is apparent that the device charging terminals 122 may be directly formed in the device body 120 rather than the battery cover 180 such that the device charging terminals 122 may be opened and closed by the sliding of the sliding cover 500.

The battery cover 180 may include a receiving section 182 for accommodating the sliding cover 500, and the fixing strap 200 may include an interworking bracket 540 that enables interworking between a movement of the fixing strap 200 and opening/closing of the sliding cover 500 in order to slide the sliding cover 500 according to the movement of the fixing strap 200 and accommodate the fixing strap 200 in the receiving section 182.

The position of the interworking bracket 540, which interconnects the sliding cover 500 and the fixing strap 200, and the positions of the device charging terminals 122, which are formed in the device body 120, may be selectively designed.

Although not specifically illustrated, the interworking bracket 540 may include connector charging terminals 320 that can be electrically connected to or separated from the device charging terminals 122 depending on the position of the fixing strap 200, where movement of the fixing strap 200 results in covering or uncovering the device charging terminals 122 by the sliding cover 500.

Since the fixing strap 200 and the sliding cover 500 interwork with each other through the interworking bracket 540, when the sliding cover 500 slides according to the movement of the fixing strap 200 and is received in the receiving section 182, the device charging terminals 122 may be opened and connected to the connector charging terminals 320 so that charging may be performed. In contrast, when the sliding cover 500 slides from the receiving section 182 to close the device charging terminals 122, water-proofing may be performed.

As described above, according to the various embodiments of the present disclosure, the fixing strap, which has the interface terminal installed therein into which a general-purpose USB cable is inserted for charging, slides to a predetermined position to open/close the cover so that charging can be easily performed while a water-proofing function is maintained.

According to the embodiments of the present disclosure, the interface terminal is installed in the interior of the fixing strap so that charging can be performed without a separate adaptor or a connector on the exterior of the smart watch.

Further, charging can be performed by using a general-purpose USB cable rather than a separate cable or adaptor, thereby enhancing usability and reducing material costs.

In addition, according to the various embodiments of the present disclosure, the connector charging terminals and the device charging terminals, which are installed inside the band, are separated from each other so that the charging terminals are not exposed to the outside when the smart watch is worn, thereby preventing the battery from being discharged due to an electrical connection between the charging terminals.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed:

1. An electronic device comprising:
   a device body;
   a band that couples the device body to a target object;
   a fastening part that adjusts a fit of the band coupled to the target object;
   a fixing strap movably coupled to the band;
   an interface terminal, installed in a body of the fixing strap, comprising a connector charging terminal;
   a terminal, corresponding to the interface terminal in the band, comprising a device charging terminal; and
   a movable cover to protect the terminal corresponding to the interface terminal,
   wherein the movable cover is moved such that the terminal corresponding to the interface terminal and the interface terminal are electrically connected based on a position of the fixing strap.

2. The electronic device of claim 1, wherein the hand comprises a first band and a second band, and the first band comprises the fastening part.

3. The electronic device of claim 2, wherein the fixing strap is securely placed on the first band so as to slide thereon without falling off.

4. The electronic device of claim 2, wherein the interface terminal is installed in an interior of the fixing strap, and a space into which the second band is inserted is formed between the interface terminal and the first band.

5. The electronic device of claim 1,
   wherein the device charging terminal is configured to charge the device body, and
   the movable cover comprises one or more seals made of electrically insulated material to protect the device charging terminal.

6. The electronic device of claim 1, wherein when the fixing strap slides to a predetermined position of the band, the movable cover is moved such that the device charging terminal and the connector charging terminal are electrically connected to each other.

7. The electronic device of claim 1, wherein when the movable cover is over the device charging terminal the device charging terminal is not electrically connected to the connector charging terminal.

8. The electronic device of claim 1, wherein a USB cable is inserted into the interface terminal to perform charging.

9. The electronic device of claim 1, wherein a portion of the movable cover is cut away in a shape of an inverted triangle with respect to the device charging terminal, and the movable cover is connected to the interface terminal through a connecting member.

10. The electronic device of claim 1, wherein the band comprises a receiving section for receiving the movable cover, and the movable cover and the fixing strap are coupled to each other by a coupling bracket.

11. The electronic device of claim 1, wherein the device charging terminal is installed in the device body, and the movable cover is enabled to cover the device charging terminal or expose the device charging terminal.

12. The electronic device of claim 11, wherein the device body comprises a receiving section for receiving the movable cover and an interworking member that enables interworking between a movement of the fixing strap and opening/closing of the movable cover.

13. The electronic device of claim 12, wherein the interworking member comprises an interworking bracket that couples the movable cover and the interface terminal, and the interworking bracket comprises the connector charging terminal.

14. An electronic device comprising:
   a device body;
   a band for wearing the device body on a target object;
   a fastening part that is configured to adjust a fit of the band to the target object;
   a fixing strap movably coupled to the band;
   an interface terminal installed in a body of the fixing strap;
   a device charging terminal for charging the device body;
   a connector charging terminal coupled to the interface terminal; and
   a movable cover for the device charging terminal configured to allow access to the device charging terminal,
   wherein the movable cover is opened or closed according to a movement of the fixing strap such that the device charging terminal and the connector charging terminal are electrically connected to each other when the movable cover is opened, or electrically separated from each other when the movable cover is closed.

15. The electronic device of claim 14, wherein the band comprises the device charging terminal, and the fixing strap comprises the connector charging terminal.

16. The electronic device of claim 14, wherein the device body comprises the device charging terminal, and an interworking member, configured to enable interworking between the movement of the fixing strap and opening/closing of the movable cover, comprises the connector charging terminal.

17. A method of charging an electronic device, the method comprising:
   inserting a USB cable in to an interface terminal installed in a body of a fixing strap, the inserting promoting movement of the fixing strap, wherein the movement of the fixing strap opens a movable cover of a device charging terminal enabling electrical connection of the device charging terminal and the connector charging terminal, wherein a connector charging terminal is a part of the fixing strap and is electrically connected to the interface terminal, and the device charging terminal is electrically connected to a battery of the electronic device.

* * * * *